United States Patent
Houtman et al.

[11] 3,772,847
[45] Nov. 20, 1973

[54] METHOD OF TRANSFERRING SUBSTANCES CONTAINED IN A CURRENT OF GAS TO A CURRENT OF LIQUID, IN WHICH THE SUBSTANCES ARE CONCENTRATED

[75] Inventors: Johannes Paulus Willem Houtman; Walter Adam Cramer; Gerrit Johan Piet, all of Delft, Netherlands

[73] Assignee: U.S. Philips Corporation, New York, N.Y.

[22] Filed: July 12, 1971

[21] Appl. No.: 161,974

Related U.S. Application Data

[63] Continuation of Ser. No. 765,351, Oct. 7, 1968, abandoned.

[52] U.S. Cl. .................................. 55/92, 55/230
[51] Int. Cl. ....................................... B01d 53/14
[58] Field of Search .............. 55/68, 84, 90–92, 55/220, 230, 235, 238, 456; 261/83, 84

[56] References Cited
UNITED STATES PATENTS

| | | | |
|---|---|---|---|
| 3,162,036 | 12/1964 | Ayers | 55/92 |
| 3,358,413 | 12/1967 | Kalika | 55/238 |
| 2,880,979 | 4/1959 | Wheeler | 261/84 |
| 3,386,228 | 6/1968 | Hartmann | 55/68 |

FOREIGN PATENTS OR APPLICATIONS

| 920,203 | 3/1963 | Great Britain | 55/235 |
|---|---|---|---|

*Primary Examiner*—Charles N. Hart
*Attorney*—Frank R. Trifari

[57] ABSTRACT

A method of transferring substances contained in a radioactive gas to a current of liquid in which the substances are concentrated after which they are analyzed. The gas is introduced into a vertically arranged cylindrical tube in which a rotary shaft provided with blades, preferably helical blades, rotates which blades carry a liquid which absorbs the gas. During the period in which the transfer of the substance is substantially complete, the component of the velocity of the gas current in the direction of movement of the liquid is not greater than the travelling speed of the liquid.

2 Claims, 1 Drawing Figure

PATENTED NOV 20 1973
3,772,847
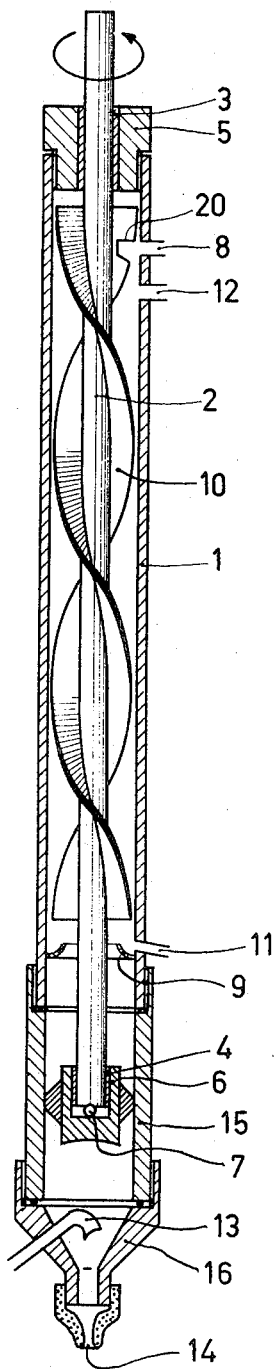
INVENTORS
JOHANNES P. W. HOUTMAN
WALTER A. CRAMER
GERRIT J. PIET
BY
Frank R. Trifari
AGENT

METHOD OF TRANSFERRING SUBSTANCES CONTAINED IN A CURRENT OF GAS TO A CURRENT OF LIQUID, IN WHICH THE SUBSTANCES ARE CONCENTRATED

This application is a continuation of application, Ser. No. 765,357 filed Oct. 7, 1968 and now abandoned.

The invention relates to a method of transferring substances contained in a current of gas to a current of liquid, in which the substances are concentrated.

These substances may be, for example, the gaseous constituents marked as radio-active, which successively emerge from a gas-chromatographic device. In a gas-chromatographic device, a mixture to be examined of substances marked as radio-active is mixed with a carrier gas and is passed through a fractioning column filled with an adsorbent. In the fractionating column, the mixture is decomposed into the various constituents which leave the column successively in time. After the constituents have left the column, they are supplied to an apparatus by means of which the concentration of the constituents in the current of carrier gas is detected. This apparatus is, for example, a flame ionisation detector. The radio-activity must be measured of some of the gaseous constituents emerging from the detector and formed by combustion when a flame ionisation detector is used. In order to permit the measurement of very small radio-activities of such constituents, it is generally required that the relevant constituents be concentrated.

A requirement frequently imposed on the concentration is that this process must be continuous. In general, it is also required for the concentration variations in time of the constituents to remain completely or substantially completely uniform.

An object of the invention is to fulfil these requirements. It is characterized in that the gas containing radio-active constituents is brought into contact with a current of liquid moving in a direction transverse or parallel to the direction of flow of the gas in a manner such that during the period, in which the transfer of substance is substantially complete, the component of velocity of the gas current in the direction of movement of the liquid is equal to or smaller than the travelling speed of the liquid.

The gases are concentrated in the liquid by absorption. The liquid is then passed through a known measuring device, which, for example, includes an anthracene cell detecting the radio-activity in the liquid.

A favourable device for carrying out the method according to the invention comprises a vertically or substantially vertically arranged cylindrical tube and a rotary shaft coaxial with the tube and provided with blades. Thus, the gas and the liquid are thoroughly mixed.

The blades are preferably uninterrupted and have a diameter approximately equal to the inner diameter of the tube. In an advantageous embodiment, the blades are of helical form, while at the location of the lateral inlet of the liquid the blades are provided with a notch which promotes atomization of the liquid.

The invention will be described with reference to the drawing.

In the FIGURE, reference numeral 1 denotes a vertically arranged cylindrical tube. The shaft 2 provided with blades 10 is rotatably journalled in the tube 1. The blades 10 extend helically over a large part of the shaft 2. The shaft is centered in bearings 3 and 4 which are in turn arranged in bearing housings 5 and 6. The shaft 2 bears on a ball 7.

Through the aperture 8, liquid is admitted into the tube 1 at a constant rate of volume. The liquid gets into contact with the part of the blades 10 located at the inlet aperture 8, which blades rotate at a comparatively high speed. The notch 20 in the part of the blades located opposite the inlet aperture ensures a satisfactory atomization of the liquid. The liquid is thrown against the inner wall of the cylinder 1 and flows downwards in the form of a more or less homogeneous liquid film. The gas constituents to be examined are mixed with an inert carrier gas and are introduced through the aperture 12. The inert carrier gas leaves the cylindrical tube 1 through the outlet aperture 13. The liquid in which the constituents to be examined are absorbed is collected into the annular gutter 9 and is passed through the outlet aperture 11 to a measuring device.

The device operates as follows. The gas current emerging from the flame ionisation detector (not shown) is conducted along the liquid film at a low speed. The speed of the gas current flowing downwards is equal to or smaller than the travelling speed of the liquid film. The gas constituents, for example, $^{14}C$-containing $CO_2$ pulses originating from various gas-chromatographically separated $^{14}C$-containing compounds, are successively absorbed in the liquid film flowing downwards, for example, a solution of NaOH.

It has been found that the absorption is substantially complete if a few conditions are fulfilled. Firstly, the speed of rotation of the shaft 2 must be high, for example, 2,000 revolutions per minute. Experiments have shown that with stationary shaft 2, the absorption along the same length of tubing is only approximately 60 percent.

Secondly, with regard to the formation of a large surface of the liquid film the interior of the tube 1 must be thoroughly cleaned, while by a suitable choice of the material of the tube wall and by addition to the liquid of a substance reducing the interface tension a suitable interface tension is obtained between the film and the tube wall.

The influence of the travelling speed of the gas current is found to be small, while the length of the part of the shaft 2 provided with blades is not particularly critical.

In order to obtain an optimum contact between the liquid and the gas, the distance of the inner side of the tube 1 from the blades 10 is chosen to be very small, for example, 0.1 mm. By this step in conjunction with a considerably increased speed of rotation of the shaft 2, a very large absorption of the radio-active $^{14}CO_2$ constituents in the NaOH solution is obtained. Possibly, the NaOH film will be lifted in part from the periphery by the rotating blades 10, divided into fine drops and again thrown against the wall of the tube 1 by centrifugal force.

The $^{14}C$-containing $CO_2$ pulses produced in the flame ionisation detector enter the cylinder 1 through the aperture 12. These pulses, which do not coincide in the detector, must remain separated even if they are absorbed in the liquid film. Pulse widening (peak widening) must be avoided as far as possible. Therefore, it is required that the travelling speed of the gas current not exceed that of the liquid current. Otherwise, when the travelling speed of the liquid current largely exceeds that of the gas current, this results in unnecessary dilutions. The tube 1 must therefore have a suitable inner diameter.

The peak widening will be a minimum if the linear travelling speed of the liquid is uniform over a cross-section of the cylinder and if the film does not flow along a helical path. Also in this case, it is advantageous to keep the inner side of the cylindrical tube 1 smooth and free of grease and to add to the solution of NaOH a small quantity of a substance reducing the interface tension.

Furthermore, the outlet duct of the liquid must be as small as possible. Dead space must be avoided in order to minimize the variations in the time during which the gas and the liquid are in the tube.

It has been found that there is a given percentage by weight of a solution of NaOH, i.e. approximately 15 percent by weight, at which the rate of absorption of $CO_2$ in NaOH is most favourable. Below 15 percent by weight, the rate of absorption decreases; above 15 percent by weight, the solution becomes more viscous and the $Na_2CO_3$ is more readily deposited.

The liquid can emerge not only through the gutter 9 and the outlet aperture 11, but also through the aperture 14 aligned to the shaft 2. The helical parts 15 and 16 provide this outlet duct. The gutter 9 must then be removed. Also in this case, dead corners must be avoided as far as possible.

The inlet aperture 8 for the liquid is located above the inlet aperture 12 for the gas in order that the gas flowing upwards through the tube will nevertheless be freed from $CO_2$.

The liquid emerging from the outlet aperture 11 and 14, respectively, is conducted to a known measuring device which detects the concentration of the radio-active elements in the liquid. The measuring device may be either a continuous or a discontinuous measuring device supplied by a fraction collector.

The method and the device according to the invention can be used for various purposes. Firstly, the radio-activity of constituents which are to be absorbed and are contained in order of succession in a current of inert gas can be recorded ("gas-liquid chromatography"). Secondly, particles of liquid or of solid substance contained in a current of gas can thus be continuously concentrated and measured. Use: continuously recording the radio-activity of air.

Thirdly, one constituent which is to be absorbed and is contained in a current of an inert gas in varying quantities can be continuously recorded. Use: tracing "marked" decomposition products.

We claim:

1. A method of transferring and concentrating radio-active constituents present in a gas current into a liquid current said method comprising, bringing said gas current into contact with a concurrently flowing liquid current, mixing said gas current with said liquid current and regulating the relative velocities of the gas current and the liquid current during the period when transfer of the radioactive constituent occurs from the gas current to the liquid current, in a manner such that the component of velocity of the gas current in the direction of movement of the liquid current is equal to or smaller than the speed of the liquid current.

2. A device for transferring substances contained in a current of gas containing radioactive constituents to a current of liquid in which the substances are concentrated comprising a substantially vertically arranged cylindrical tube having inlet and outlet apertures for the gas and a lateral liquid inlet, and a rotary shaft coaxial with the tube and provided with blades, said blades are of helical form and at the location of the lateral inlet of the liquid they are provided with a notch which promotes atomization of the liquid, and means to rotate the shaft at a speed at which during the period in which the transfer of substance is substantially complete, the component of velocity of the gas current in the direction of movement of the liquid is not greater than the travelling speed of the liquid.

* * * * *

PO-1050
(5/69)

UNITED STATES PATENT OFFICE
CERTIFICATE OF CORRECTION

Patent No. 3,772,847                    Dated   November 20, 1973

Inventor(s)  JOHANNES PAULUS WILLEM HOUTMAN ET AL

It is certified that error appears in the above-identified patent and that said Letters Patent are hereby corrected as shown below:

In the title page insert -- Foreign Application

Priority Data-October 18, 1967, Netherlands, 6,714,123 --.

Signed and sealed this 16th day of April 1974.

(SEAL)
Attest:

EDWARD M.FLETCHER,JR.                       C. MARSHALL DANN
Attesting Officer                           Commissioner of Patents

PO-1050
(5/69)

UNITED STATES PATENT OFFICE
CERTIFICATE OF CORRECTION

Patent No. 3,772,847      Dated November 20, 1973

Inventor(s) JOHANNES PAULUS WILLEM HOUTMAN ET AL

It is certified that error appears in the above-identified patent and that said Letters Patent are hereby corrected as shown below:

In the title page, item [63], "765,351" should be -- 765,357 --.

Signed and sealed this 24th day of September 1974.

(SEAL)
Attest:

McCOY M. GIBSON JR.
Attesting Officer

C. MARSHALL DANN
Commissioner of Patents